(12) United States Patent
Feller

(10) Patent No.: US 8,683,873 B1
(45) Date of Patent: Apr. 1, 2014

(54) PHASE DETECTOR FOR A VORTEX FLOWMETER USING ULTRASONIC TRANSDUCERS CONNECTED TO SEPARATE TRANSFORMERS FOR PHASE DETECTION

(75) Inventor: Murray F Feller, Micanopy, FL (US)

(73) Assignee: Onicon, Inc., Clearwater, FL (US)

( * ) Notice: Subject to any disclaimer, the term of this patent is extended or adjusted under 35 U.S.C. 154(b) by 121 days.

(21) Appl. No.: 13/572,737

(22) Filed: Aug. 13, 2012

Related U.S. Application Data

(63) Continuation-in-part of application No. 13/235,696, filed on Sep. 19, 2011, now Pat. No. 8,408,071.

(51) Int. Cl.
*G06F 1/32* (2006.01)
*G01F 1/66* (2006.01)

(52) U.S. Cl.
USPC ..................... 73/861.23; 73/861.27

(58) Field of Classification Search
None
See application file for complete search history.

(56) References Cited

U.S. PATENT DOCUMENTS

| | | | | | |
|---|---|---|---|---|---|
| 4,297,898 A | * | 11/1981 | Herzl | ......................... | 73/861.22 |
| 4,307,619 A | * | 12/1981 | Herzl | ......................... | 73/861.24 |
| 4,457,181 A | * | 7/1984 | Marsh | ......................... | 73/861.22 |
| 4,970,902 A | * | 11/1990 | Misumi et al. | ............. | 73/861.23 |
| 5,429,001 A | * | 7/1995 | Kleven | ......................... | 73/861.22 |
| 6,422,093 B2 | * | 7/2002 | Feller | ......................... | 73/861.27 |
| 6,457,371 B1 | * | 10/2002 | Feller | ......................... | 73/861.29 |
| 6,508,134 B1 | * | 1/2003 | Feller | ......................... | 73/861.27 |
| 8,464,596 B1 | * | 6/2013 | Feller | ......................... | 73/861.23 |
| 8,578,787 B1 | * | 11/2013 | Feller | ......................... | 73/861.23 |

* cited by examiner

*Primary Examiner* — Harshad R Patel
(74) *Attorney, Agent, or Firm* — David Kiewit

(57) ABSTRACT

A vortex-shedding flowmeter uses two ultrasonic transducers to generate an acoustic beam at a selected carrier frequency. Vortices generate fluid oscillations that are detected when they pass through the beam and induce phase changes representative of fluid flow rate. In an improved vortex-shedding flowmeter each of the transducers is connected to a separate transformer and the outputs of the two transformers are interconnected to yield the phase change.

12 Claims, 3 Drawing Sheets

PHASE DETECTOR FOR A VORTEX FLOWMETER USING ULTRASONIC TRANSDUCERS CONNECTED TO SEPARATE TRANSFORMERS FOR PHASE DETECTION

This application is a continuation-in-part of the inventor's U.S. patent application Ser. No. 13/235,696, filed on Sep. 19, 2011.

This document generally relates to measuring fluid flow by measuring vibrations or acoustic energy generated by a vortex shedding structure or by a fluidic oscillator.

BACKGROUND OF THE INVENTION

Background Information

A vortex shedding flow meter 10, as depicted in FIG. 1, comprises a plurality of bluff bodies 12 oriented perpendicular to a flow direction 14. Fluid flow generates a sequence of vortices that are shed by the bluff bodies which cause flow oscillations that are detected when they pass through an ultrasonic beam 16 extending between two ultrasonic transducers 18, 20. As described in my parent application U.S. Ser. No. 13/235,696, a phase measurement can lead to an output signal having a frequency representative of the rate of flow. The low flow rate measurement limit of such a flowmeter is commonly set by interference from the vortex detecting circuit itself, or by external ambient signals. There is a need for improved systems and methods for extending the measurement range of a vortex-shedding flowmeter.

Turning now to FIG. 2 one finds a schematic depiction of an FM ratio detector 22, which is a known circuit used to extract modulation components of FM signals. This circuit provides good noise immunity and good common mode isolation and rejects amplitude modulation components. However, it is basically used to detect modulation components of a single continuous carrier signal, and its frequency has large excursions. The FM ratio detector is therefore poorly suited for a vortex flow meter measurement which requires detecting very small phase changes between two signals at the same constant frequency, where each of those two signals has a low duty cycle and low signal power. Some aspects of this device are incorporated in the present invention.

In operation of the FM ratio detector 22, a single FM signal enters an input amplifier 24 which has a high output impedance and which drives the high Q tuned primary 28 of a transformer 26. The primary 28 is tightly coupled to a secondary winding 30 and loosely coupled to a high Q tuned secondary 32. The voltages from the secondaries 30, 32 are summed. In this arrangement the secondary 30 supplies the common mode signal to the center tap of the winding 32. At the center frequency, the winding 30 contributes in-phase signals but there is a ninety degree phase shift between the signals from the primary and the secondary 32 winding so that diodes 34, 36, in conjunction with the filter capacitors 38, 40, and resistors 42, 44 respectively, produce equal but oppositely polarized voltages at terminals A and B. Resistors 46, 48 sum these voltages to produce zero output volts. When the frequency changes, the phase relationship between the signals changes so that the voltages across the summing resistors 46, 48 are no longer equal and produce a corresponding output signal. An output capacitor 50 helps maintain the sum of the signals across the summing resistors 46, 48 constant. In so doing, this prevents the detection of signals corresponding to phase modulation of low duty cycle acoustic transmissions.

BRIEF SUMMARY OF THE INVENTION

One aspect of the invention is that it provides an improved phase detector for use in a vortex-shedding fluid flow sensor. Sensors of this sort comprise structural elements inducing an oscillating flow component transverse to a fluid flow direction and representative of a rate of flow when the fluid is flowing along the flow direction. The oscillating flow components are detected with a pair of ultrasonic transducers defining an acoustic path intersecting the vortices. Phase modulation is generated when the oscillating flow component intercepts the acoustic path. An embodiment of the invention comprises a phase modulation detector comprising a pair of transformers, each transformer having a primary winding respectively connected to one of the transducers—e.g., via a respective input amplifier. The secondaries of the two transformers are connected together with rectification and filter circuitry to sum the secondary voltages and to yield an output voltage representative of the phase modulation and thereby of the flow rate. In a preferred embodiment the rectification function may be carried out by diodes and low pass filtering may be provided by respective resistor-capacitor pairs.

Another aspect of the invention is that it provides a method of measuring a rate of fluid flow along a flow direction by generating fluid oscillations extending transverse to the flow direction; operating a pair of ultrasonic transducers to generate an acoustic beam intercepting the fluid oscillations; and detecting a change in phase relationship associated with the interception of the fluid oscillations. In this method the detecting step is carried out by summing (e.g., via a combination of rectification and low pass filtering) the voltages of the secondary windings of two transformers that are respectively connected to each of the transducers. This yields an output voltage representative of the phase modulation and thereby of the flow rate.

Yet another aspect of the invention is that it provides apparatus and methods for extending the measurement range of a vortex-shedding flowmeter.

A further aspect of the invention is that it provides apparatus for detecting phase at essentially a constant frequency of a signal that provides both a low duty cycle and low signal power.

Those skilled in the art will recognize that the foregoing broad summary description is not intended to list all of the features and advantages of the invention. Both the underlying ideas and the specific embodiments disclosed in the following Detailed Description may serve as a basis for alternate arrangements for carrying out the purposes of the present invention and such equivalent constructions are within the spirit and scope of the invention in its broadest form. Moreover, different embodiments of the invention may provide various combinations of the recited features and advantages of the invention, and that less than all of the recited features and advantages may be provided by some embodiments.

DETAILED DESCRIPTION OF A PREFERRED EMBODIMENT

In studying this Detailed Description, the reader may be aided by noting definitions of certain words and phrases used throughout this patent document. Wherever those definitions are provided, those of ordinary skill in the art should understand that in many, if not most, instances such definitions apply both to preceding and following uses of such defined words and phrases.

Figure 1:
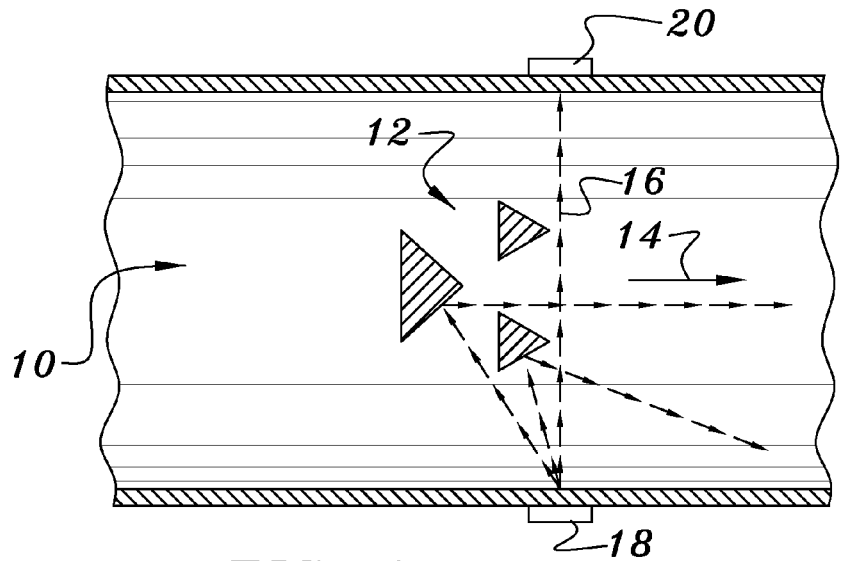
FIG. 1 is a schematic cross-sectional view of a sensing head portion of a vortex shedding flowmeter.
Figure 4:
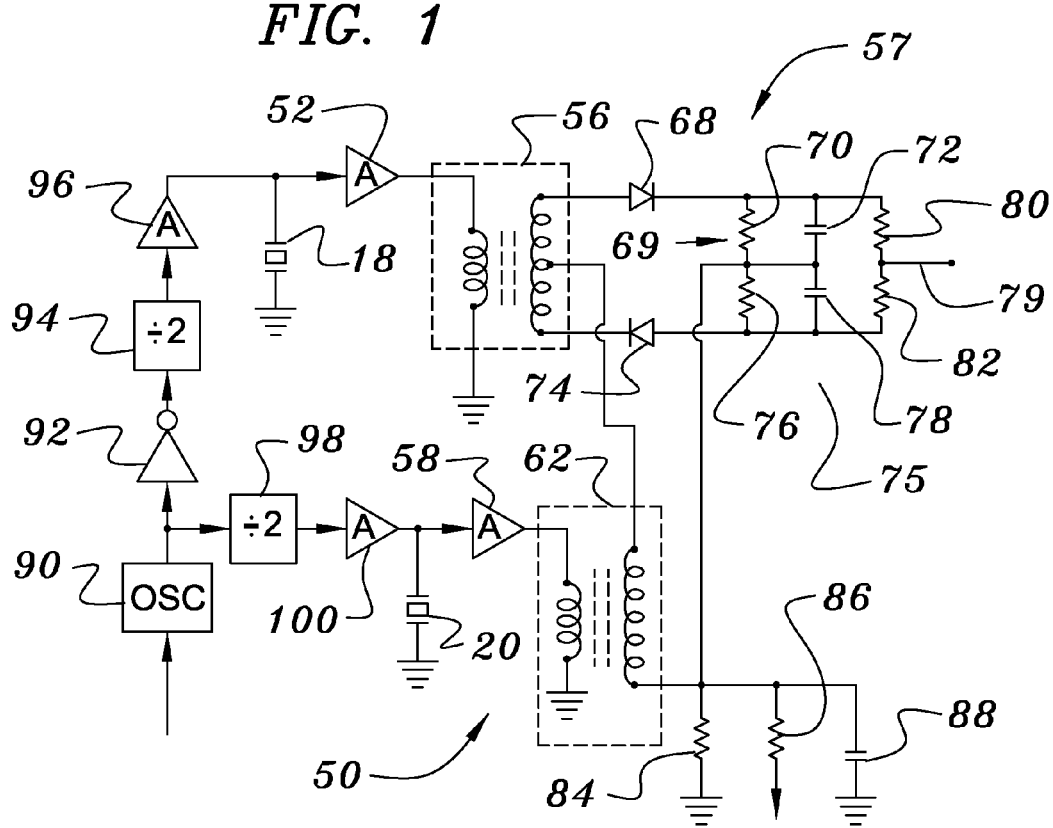
FIG. 4 is a circuit schematic showing the phase detector of FIG. 3 connected to vortex sensing acoustic transducers.
Figure 2:
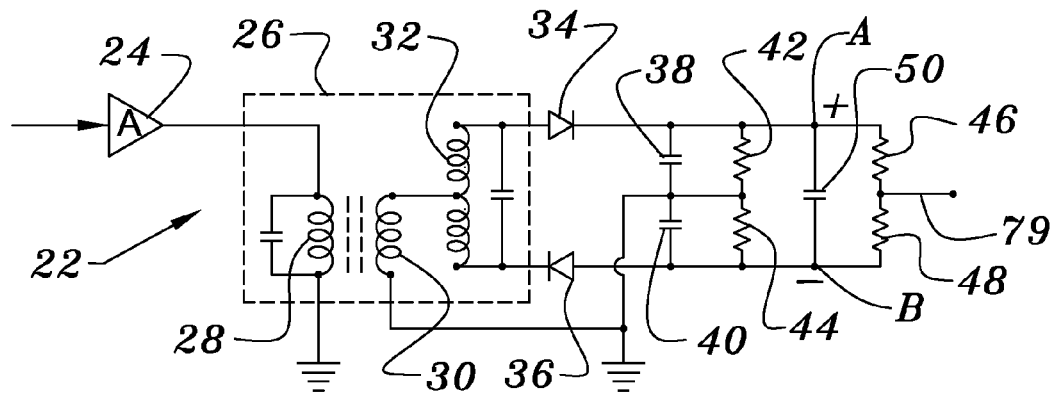
FIG. 2 is a circuit schematic of a prior art FM ratio detector.
Figure 3:
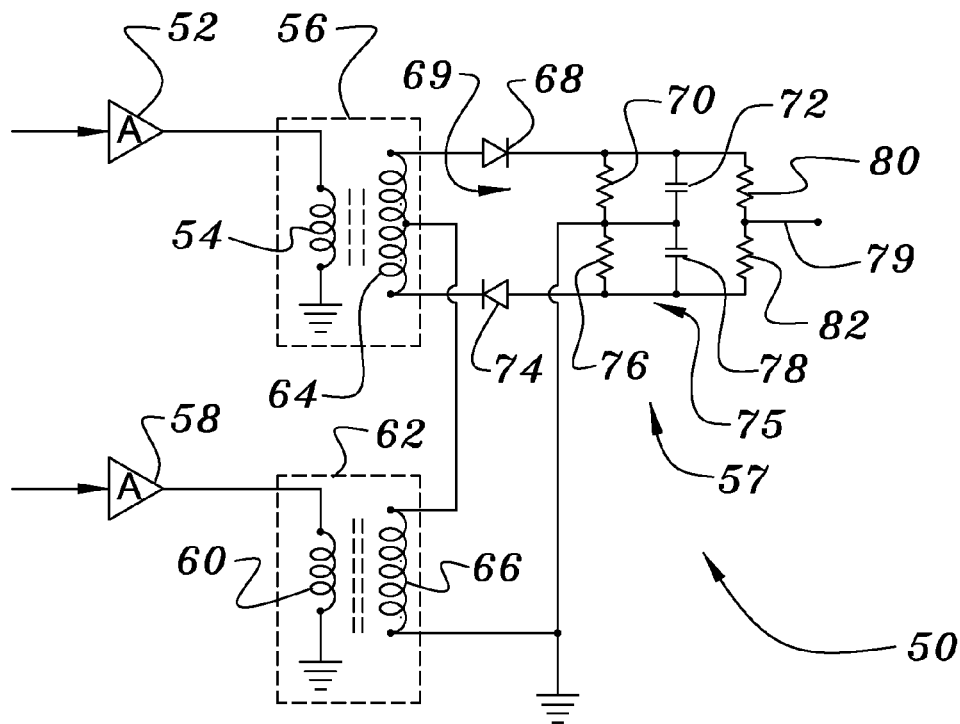
FIG. 3 is a circuit schematic of a phase detector of the invention.

Turning now to FIGS. 3 and 4, one finds exemplar embodiments of a phase detector 50 of the invention. In these embodiments a first transducer 18 is connected through an input amplifier 52 to the primary winding 54 of a wideband transformer 56. A second transducer is connected to the primary 60 of a second transformer 62 through a second input amplifier 58. The voltages from both transformer secondaries 64, 66 are summed by an arrangement in which the secondary winding 66 of the second transformer 62 supplies a common mode signal to a center tap of the secondary winding 64 of the first transformer 56 and in which the two ends of the secondary winding 64 of the first transformer 56 are connected to rectification and filter circuitry 57. In a preferred embodiment, when the signals are in phase a diode 68, having its anode connected to one end of the secondary winding 64, detects the maximum signal across the low pass filter 69 comprised of a resistor 70 and capacitor 72 connected in parallel. The opposite polarity from the winding 64 of the first transformer 56 opposes that from the winding 66 of the second transformer 62 so that a second diode 74, having its cathode connected to the other end of the winding 64, detects the minimum voltage across the low pass filter 75 consisting of a resistor 76 and capacitor 78. The tap 79 between two output resistors 80, 82 responds to the voltage difference between the two filtered outputs and thus provides the output signal.

As the phase difference between the signals supplied to the two input amplifiers 52, 58 increases, the voltage difference between the two low pass filters 69, 75 eventually reaches zero. This occurs when the phase difference is 90 degrees. When the phase difference increases to 180 degrees the output from the detector will again be at a maximum, but with the opposite polarity.

Preferred wideband transformers 56, 62 have their windings close-coupled and generally exhibit small phase shifts as do the amplifiers 52, 58 and other components in the signal path so that the signals should be nominally in phase. Detecting the change in phase of sinusoidal signals under these conditions can be problematic because the slope of the detection curve is essentially zero for small signals, and for large phase changes, can double the frequency of the phase modulation. By introducing a differential phase shift in one or both signal paths, this issue can be resolved. The amplifiers, for example, can incorporate tuned circuits that resonate on either side of a carrier frequency where each circuit provides a forth five degree phase shift for a total phase shift of ninety degrees. However, the response time is slower because of operation near resonance so that longer transmitted signal bursts and greater receiver operating times consuming more electrical power must be employed.

In another preferred embodiment schematically depicted in FIG. 4, a phase detector is shown which incorporates the detector of FIG. 3 operating with signal paths having a nominal 90 degree phase difference. The phase detector 50 has its output DC biased and stabilized by resistors 84, 86 and a capacitor 88 to have the output signal centered between the power rails. Transmitter burst signals transmitted from an oscillator 90 at twice the desired transmitted frequency are inverted by an inverter 92 and then divided by two by a divider 94 before entering a first transmit amplifier 96. The burst signals from the oscillator 90 also are divided by two by a second divider 98 before being input to the second transmit amplifier 100. When the transmit burst occurs, the transducers 18 and 20 are energized at the same time but with signals which are 90 degrees out of phase. The received signals are therefore also 90 degrees out of phase so that the phase detector 50 can operate over its full range with minimum power being supplied to the meter.

Figure 5:
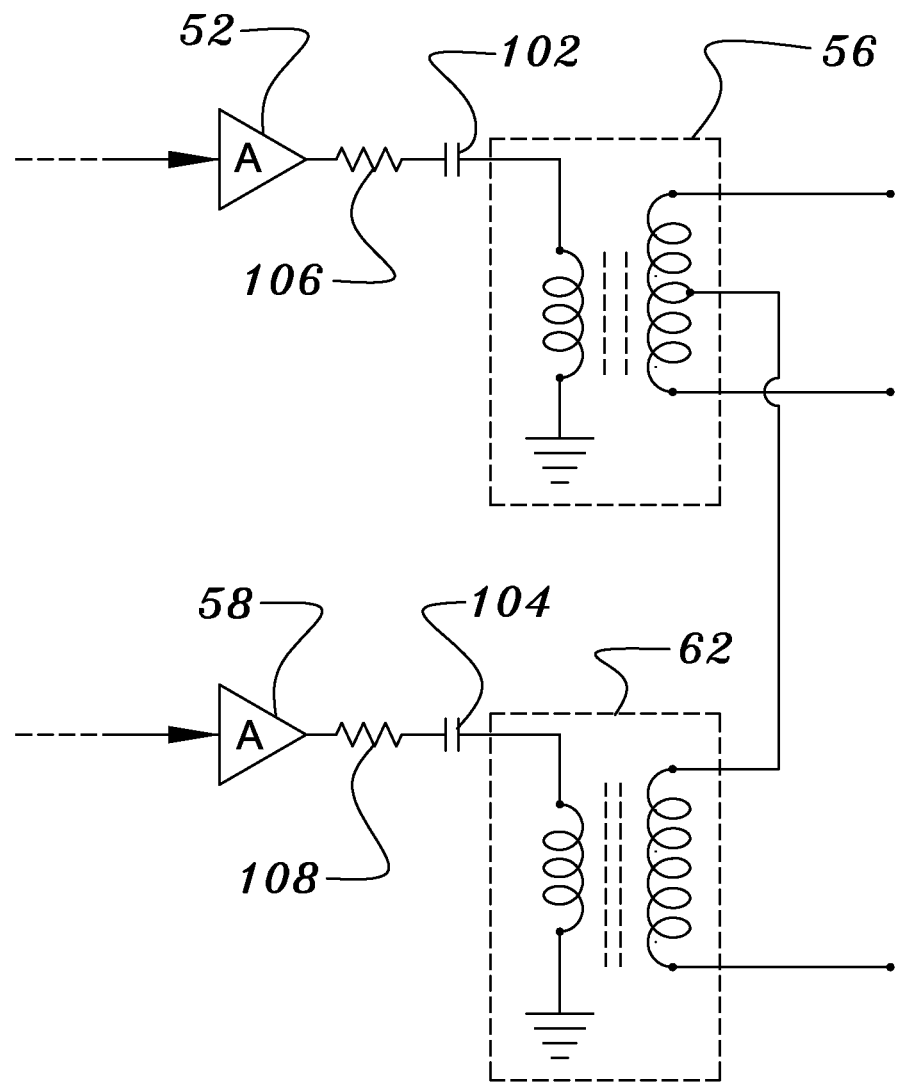
FIG. 5 is a circuit schematic showing a tuned circuit embodiment of the phase detector of the invention.

FIG. 5 is a modification of FIG. 4 in which the transformers 56, 62 resonate at the carrier frequency to provide rejection of noise and interfering signals. Relatively high secondary voltages are also available because of both the primary-to-secondary turns ratio and the Q multiplication factors. The high voltages produce greater phase detection output voltages and further reduce the susceptibility of the meter to noise and interfering signals. The transformer primaries series resonate with their respective capacitors 102, 104 while their respective resistors 106, 108 provide the desired Q. This circuit arrangement is particularly advantageous for meters operating from low voltage power sources and requiring low power and high resistance to electrical interference because higher detected signal levels are present, thus reducing the amplification required by the following amplifiers.

Although the present invention has been described with respect to several preferred embodiments, many modifications and alterations can be made without departing from the invention. Accordingly, it is intended that all such modifications and alterations be considered as being within the spirit and scope of the invention as defined in the attached claims.

The invention claimed is:

1. An apparatus for measuring a rate of fluid flow along a flow direction, the apparatus comprising:
   a flow obstruction for producing oscillating flow components transverse to the flow direction at a rate representative of the rate of fluid flow when fluid is flowing past the obstruction;
   a pair of ultrasonic transducers defining an acoustic path therebetween, the acoustic path intercepting the oscillating flow components when fluid is flowing past the obstruction;
   a pair of transformers, each having a respective primary winding respectively connected to one of the transducers, the two transformers having interconnected secondary windings; and
   rectification and filter circuitry connected to the secondary winding of at least one of the two transformers to yield an output voltage representative of the phase modulation and thereby of the flow rate.

2. The apparatus of claim 1 wherein respective secondary windings of the two transformers are interconnected to sum respective output voltages therefrom.

3. The apparatus of claim 1 further comprising tuning circuitry operable to cause the transformers to resonate at a carrier frequency at which the ultrasonic transducers are operable.

4. The apparatus of claim 1 wherein the flow obstruction comprises a plurality of bluff bodies and the oscillating flow components are produced from vortices shed from the bluff bodies.

5. The apparatus of claim 1 wherein the secondary winding of one of the two transformers comprises a center tap and the secondary winding of the other of the two transformers is connected to the center tap.

6. The apparatus of claim 1 wherein the rectification and filter circuitry comprises a first diode having a cathode connected to a first end of the secondary winding of one of the two transformers and a second diode having an anode connected to the second end of the secondary winding of the one of the two transformers.

7. The apparatus of claim 1 wherein the rectification and filter circuitry comprises:

a first low pass filter connected to a first end of the secondary winding of a first of the two transformers, the first low pass filter comprising a parallel combination of a first capacitor and a first resistor; and a second low pass filter connected to the second end of the secondary winding of the first of the two transformers, the second low pass filter comprising a parallel combination of a second capacitor and a second resistor.

8. The apparatus of claim 1 wherein the primary windings are respectively connected to respective transducers through respective input amplifiers.

9. A method of measuring a rate of fluid flow along a flow direction, the method comprising the steps of:

generating fluid oscillations transverse to the flow direction, the fluid oscillations having an oscillation rate characteristic of the rate of fluid flow;

providing a pair of ultrasonic transducers, each connected to a respective primary winding of a respective transformer having a respective secondary winding;

operating, in a selected phase relationship, the pair of ultrasonic transducers so as to generate an acoustic beam extending therebetween, the acoustic beam intercepting the fluid oscillations;

detecting a change in the selected phase relationship associated with the interception of the fluid oscillations by summing voltages of respective secondary windings of the two transformers to yield an output voltage representative of the phase modulation and thereby of the flow rate.

10. The method of claim 9 wherein the step of generating fluid oscillations comprises providing a plurality of bluff bodies that produce a sequence of vortices.

11. The method of claim 9 wherein the transformers are tuned to resonate at a carrier frequency of the acoustic beam.

12. The method of claim 9 wherein the secondary winding of one of the transformers comprises a center tap and the secondary winding of the other of the two transformers is connected to the center tap; and wherein the step of summing voltages comprises the substeps of:

separately rectifying an output from each end of the secondary winding of the first transformer; and separately low-pass filtering the respective outputs.

* * * * *